P. L. HOWLETT.
FOOT BENCH SHEARS.
APPLICATION FILED DEC. 10, 1912.
1,064,910.
Patented June 17, 1913.
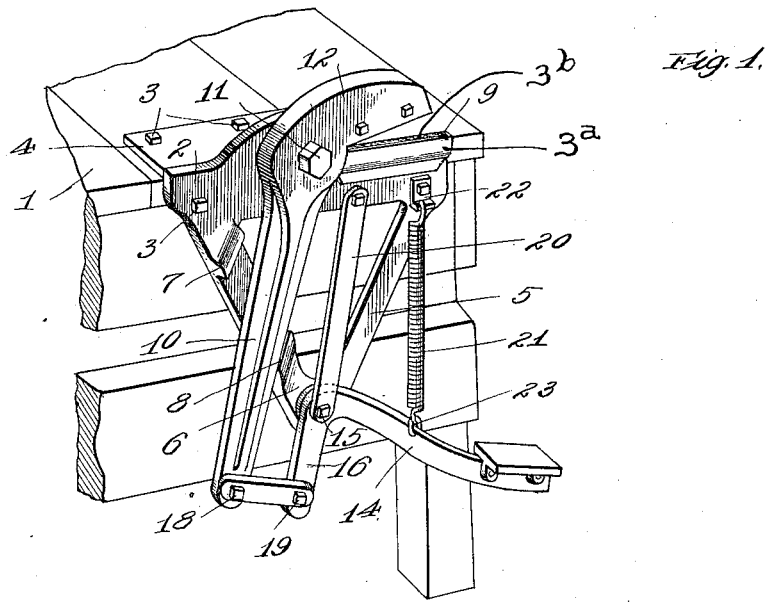
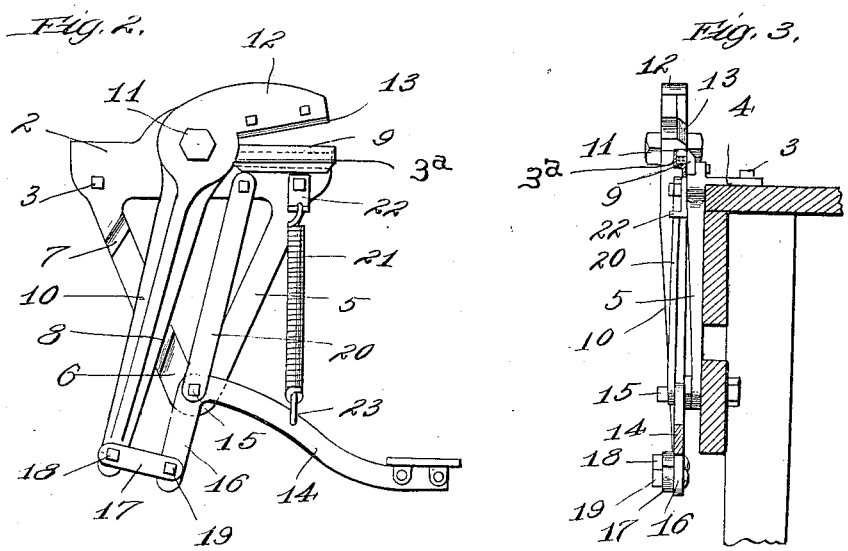
WITNESSES
INVENTOR
Peyton L. Howlett
By Knight Bros
Attorneys

UNITED STATES PATENT OFFICE.

PEYTON L. HOWLETT, OF BROWNWOOD, TEXAS.

FOOT BENCH-SHEARS.

1,064,910.       Specification of Letters Patent.     Patented June 17, 1913.

Application filed December 10, 1912. Serial No. 736,040.

*To all whom it may concern:*

Be it known that I, PEYTON L. HOWLETT, a citizen of the United States, residing at Brownwood, in the county of Brown and State of Texas, have invented certain new and useful Improvements in Foot Bench-Shears, of which the following is a specification.

The object of my invention is to provide a foot operated shears of simple construction, durable, and readily secured to a bench or band table.

While I have designed my improved shears especially for use in cutting the tie bands of bales in compress it is, of course, understood that it may be used for general shearing purposes.

In the drawing: Figure 1 is a perspective view of foot bench shears embodying my invention secured to a bench, Fig. 2 is a side elevation of the same, and Fig. 3 is a front elevation of the same, the bench being shown in section.

The reference numeral 1 designates a bench of suitable construction to which the frame 2 of my improved shears is secured by means of suitable bolts or lag screws 3. The frame is provided with a right angle portion 4 adapted to rest on top of the bench, and is provided with depending members 5 and 6 integral therewith. The member 6 is provided with stops 7 and 8 to be hereinafter referred to. A knife blade or shearing edge 9 is secured to the top frame as clearly shown in the drawings.

10 is a shears arm pivotally mounted at 11 to the frame 2, said arm being provided with a forwardly projecting nose 12 to which a knife edge or shearing blade 13 is secured which is adapted to coöperate with the blade 9 in shearing bale ties, etc.

A bell crank foot lever 14 is pivoted on the post 15 to the frame 2 with the arm 16 depending below the frame substantially parallel with the shears arm 10 with which it is connected by means of a link 17, said link being pivoted at 18 to the shears arm, and at 19 to the arm 16 of the foot lever. In order to strengthen the pivot post 15 and sustain it against strain, I provide a bar 20, one end of which is secured to the frame, while the other end is secured to the pivot post.

21 is a tension spring, one end of which is connected to a bracket 22 secured to the frame 2, while the other end is connected at 23 to the foot lever.

In operation the foot lever is pressed downwardly, thereby moving the shears arm 10 rearwardly by means of the link 17, thus bringing the shearing edges or knives 9 and 13 together for the purpose of shearing a bale tie or other material. In order that the shears arm 10 may be limited in its movement, I provide the stops 7 and 8 which are positioned on the frame 2 so as to properly regulate the opening and closing of the shearing blades. The tension spring 21 is designed to hold the shearing blades normally open as shown in Fig. 2.

A foot operated bench shears is especially advantageous in cotton compress, inasmuch as it leaves the hands of the operator free for handling the bale ties, while the foot is employed to manipulate the shears.

The simple construction and compound leverage employed in my improved foot bench shears, provides a strong and durable shears which will not easily get out of order.

Cotton bale ties are treated at the factory with a preservative resembling tar which has a tendency to gum the shears, and thus reduces the efficiency of the shears. In order to overcome this, I provide frame 2 with an oil cup $3^a$ of any suitable construction in which I secure a piece of felt $3^b$, the lower edge of which is suspended in the oil, while the upper edge is in such position that it oils the edges of the shears when it is closed. I have found that when the shears blades are frequently oiled, they are kept free from the tar-like substances, thus maintaining the maximum efficiency of the shears and prolonging the life of the blades. Of course, it is understood that the felt acts as a wick to feed the oil to the shears blades.

I claim:

1. In foot bench shears, the combination with a frame and a shearing knife rigidly secured to said frame, of an arm pivotally mounted on said frame, a shearing edge carried by said arm, a foot lever pivotally mounted on said frame and having pivotal connection with said pivoted arm, a tension spring connected to said frame and to said foot lever, and stops on said frame to limit the movement of said pivoted arm.

2. In foot bench shears, the combination with a frame, stops on said frame, and a shearing edge rigidly secured to said frame, of a shear arm pivotally mounted on said frame limited in its movement by said stops, a shearing blade carried by said arm, a foot lever pivotally secured to said frame, a tension spring connected to said lever and to said frame, a link connecting the foot lever with said shear arm.

3. In foot bench shears, the combination with a frame, stops on said frame, and a shearing edge rigidly secured to said frame, of a shear arm pivotally mounted on said frame limited in its movement by said stops, a shearing blade carried by said arm, a foot lever pivotally secured to said frame, a tension spring connected to said lever and to said frame, a link connecting the foot lever with said shear arm, and a bar connected at one end to the pivot of the foot lever and at the other end to the said frame.

4. In foot bench shears, the combination with a frame, and a shearing edge rigidly secured to said frame, of a shear arm pivotally mounted on said frame, a shearing blade carried by said arm, and an oil cup secured to the frame and a wick mounted in said cup in such position that the shearing blade comes in contact therewith when closed.

The foregoing specification signed at Brownwood Texas this 19th day of November, 1912.

PEYTON L. HOWLETT.

In presence of two witnesses:
 ELMER FORD,
 D. B. ANDREWS.

---

Copies of this patent may be obtained for five cents each, by addressing the "Commissioner of Patents, Washington, D. C."